United States Patent [19]

Dhyanchand et al.

[11] Patent Number: 5,045,991

[45] Date of Patent: Sep. 3, 1991

[54] UNITY POWER FACTOR AC/DC CONVERTER

[75] Inventors: P. John Dhyanchand; Vietson Nbuyen, both of Rockford, Ill.

[73] Assignee: Sundstrand Corporation, Rockford, Ill.

[21] Appl. No.: 458,440

[22] Filed: Dec. 28, 1989

[51] Int. Cl.$^5$ .................... H02M 7/217; G05F 1/70
[52] U.S. Cl. ........................... 363/89; 363/37; 323/207
[58] Field of Search .................. 363/37, 89; 323/207

[56] References Cited

U.S. PATENT DOCUMENTS

| | | | |
|---|---|---|---|
| 4,193,111 | 3/1980 | Wester . | |
| 4,384,321 | 5/1983 | Rippel | 363/124 X |
| 4,677,366 | 6/1987 | Wilkinson et al. | 363/89 X |
| 4,729,082 | 3/1988 | Sato . | |
| 4,816,985 | 3/1989 | Tanahashi . | |

OTHER PUBLICATIONS

Article entitled, "A Current-Controlled PWM Transistor Inverter Drive", by A. B. Plunkett appearing in the publication Preceedings of the IEEE/IAS 1979 Annual Meeting, pp. 785–792.

Article entitled, "Electric Motor Drives and Control-Past, Present, and Future", by Paresh C. Sen appearing in the IEEE Transactions on Industrial Electronics, vol. 37, No. 6, Dec. 1990.

Article entitled, "Indirect Current Control of a Unity Power Factor Sinusoidal Current Boost Type Three-- Phase Rectifier", by Dixon, et al., appearing in IEEE Transactions on Industrial Electronics, vol. 35, No. 4, Nov. 1988.

Primary Examiner—Steven L. Stephan
Assistant Examiner—Emanuel Todd Voeltz
Attorney, Agent, or Firm—Marshall, O'Toole, Gerstein, Murray & Bicknell

[57] ABSTRACT

A control for an AC/DC power converter having first and second switches and which converts an AC voltage supplied by an AC source into a DC voltage on a DC output conductor includes circuitry for developing an error signal representing the deviation of the DC voltage from a desired level and a multiplier coupled to the developing circuitry and responsive to the AC voltage for deriving a reference signal representing a desired current magnitude from the AC source. A current sensor develops a current magnitude signal representing the magnitude of the current from the AC source and a circuitry having a hysteresis characteristic compares the current magnitude signal with the reference signal to obtain a comparison signal. Buffer and interface circuits operable the first and second switches in accordance with the comparison signal to in turn cause the DC voltage to approach the desired level and to cause the current from the AC power source to have a certain phase relationship with respect to the AC voltage supplied thereby.

9 Claims, 3 Drawing Sheets

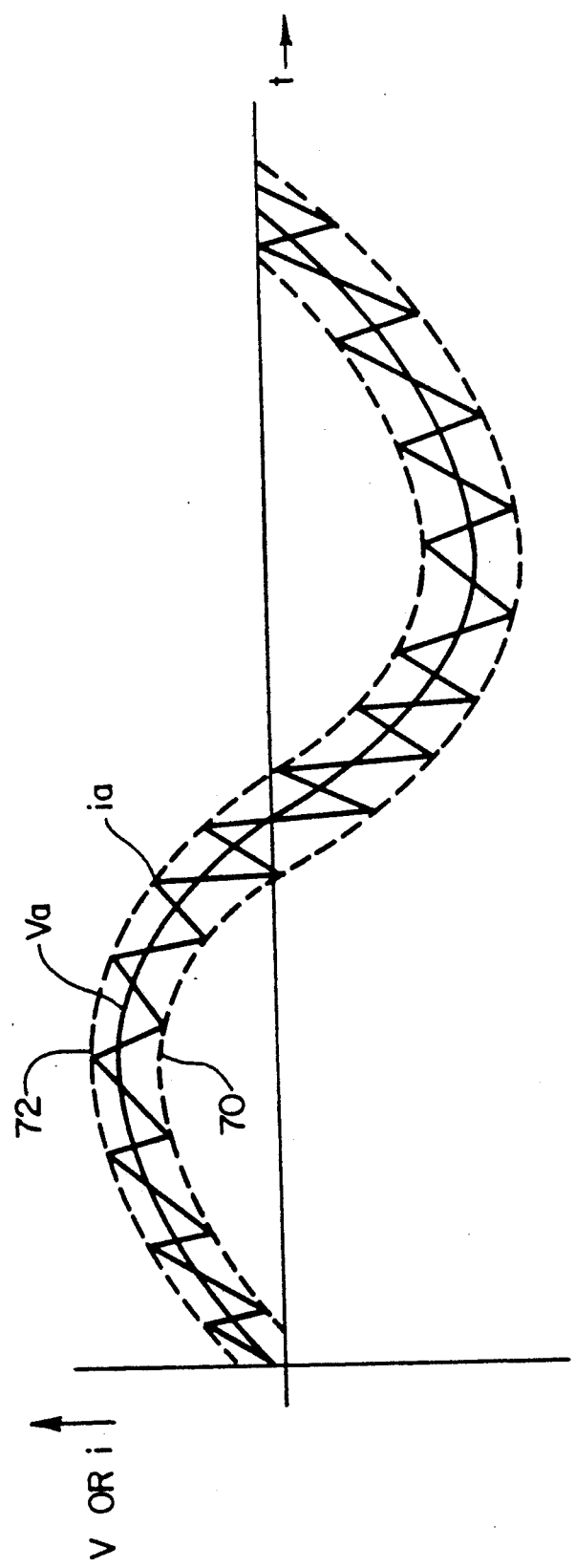

1

UNITY POWER FACTOR AC/DC CONVERTER

TECHNICAL FIELD

The present invention relates generally to power converters, and more particularly to AC/DC converters which operate at unity power factor.

BACKGROUND ART

AC/DC power converters are often required to convert AC power into DC power for a load. Where the AC power is produced by a generator, it has been found that the size of the generator for a given power requirement by the load can be minimized by operating the converter such that it appears to the generator as a unity power factor load. Numerous controls for operating an AC/DC converter at unity power factor have been developed. For example, an article entitled "Indirect Current Control of a Unity Power Factor Sinusoidal Current Boost Type Three-Phase Rectifier" by Dixon et al. appearing in *IEEE Transactions on Industrial Electronics*, Vol. 35, No. 4, Nov. 1988, discloses in FIG. 1 a control for a hysteresis current controlled rectifier which maintains the output voltage of the rectifier at a desired level and which causes the converter to operate at unity power factor. The control includes circuitry which develops an amplified and limited voltage error signal representing the deviation of the output voltage of the converter from the desired level, a multiplier which multiplies the error signal with the phase voltages produced by an AC source coupled to the rectifier and summers which sum the output of the multipliers with signals representing the phase currents. The resulting current error signals are coupled to a base drive control logic circuit which develops base drive signals for switches in the converter.

Tanahashi, U.S. Pat. No. 4,816,985 discloses in FIG. 8 thereof an acknowledged prior art control for an AC/DC converter which causes the converter to operate at unity power factor. The control includes a circuit which develops a voltage error signal representing the deviation of the output voltage of the converter from a desired voltage, first through third multipliers which multiply each of first through third voltage waveforms developed by an oscillator with the voltage error signal and first through third current control amplifiers which receive the outputs of the first through third multipliers, respectively. The current control amplifiers calculate and amplify deviations between the signals developed by the multipliers and the outputs of current detectors which develop signals representing the phase currents of an AC source coupled to the converter. The outputs of the current control amplifiers are compared against a sawtooth waveform to develop pulse-width modulation (PWM) base drive signals for switches in the converter.

Other unity power factor converter controls which develop PWM base drive signals for switches of a converter are disclosed in the above-identified Dixon et al paper and Tanahashi patent. These controls develop the base drive signals using voltage signals representing the voltages produced by the AC source coupled to the converter input, as well as signals representing the voltage at the output of the converter and the currents supplied by the AC source.

Wester, U.S. Pat. No. 4,193,111 discloses a controller for an AC/DC power converter which controls switches in the converter to cause the current delivered by an AC source coupled to the converter to track or follow the voltage produced thereby. The control circuit includes first and second comparators which compare a current command against the actual current provided by the AC source. One of the comparators has a narrow hysteresis characteristic and the other comparator has a wide hysteresis characteristic and produces a signal identifying the polarity of the voltage. The outputs of the comparators are coupled to logic circuits including logical inverters and OR gates which together develop signals for switches in the converter.

A control device for an AC/DC power converter which utilizes PWM gating circuitry responsive to the voltage produced by an AC source coupled to the converter and the output voltage of the converter is disclosed in Sato, U.S. Pat. No. 4,729,082.

SUMMARY OF THE INVENTION

In accordance with the present invention, a control for an AC/DC power converter causes the converter to operate at unity power factor in a simple and effective manner.

More particularly, a control for an AC/DC power converter which converts an AC voltage supplied by an AC source into a DC voltage on DC output conductors includes means for developing an error signal representing the deviation of the DC voltage from a desired level and means coupled to the developing means and responsive to the AC voltage for deriving a reference signal representing a desired current magnitude from the AC source. Means are coupled to the AC source for generating a current magnitude signal representing the magnitude of the current from the AC source. Means having a hysteresis characteristic compares the current magnitude signal with the reference signal to obtain a comparison signal. Means are coupled to the comparing means for operating the first and second switches in accordance with the comparison signal to in turn cause the DC voltage to approach the desired level and to cause the current from the AC power source to have a certain phase relationship with respect to the AC voltage supplied thereby.

Preferably, the comparing means introduces a hysteresis band having upper and lower limits on either side of the voltage waveform developed by the AC power source and the current from the power source switches between the upper and lower limits of the hysteresis band so that the current follows the voltage.

The control of the present invention is simple and inexpensive and is highly reliable.

BRIEF DESCRIPTION OF THE DRAWINGS

FIG. 3 comprises a waveform diagram illustrating one phase of the voltage and current supplied by the AC source of FIG. 2.

DESCRIPTION OF THE PREFERRED EMBODIMENT

Figure 1:
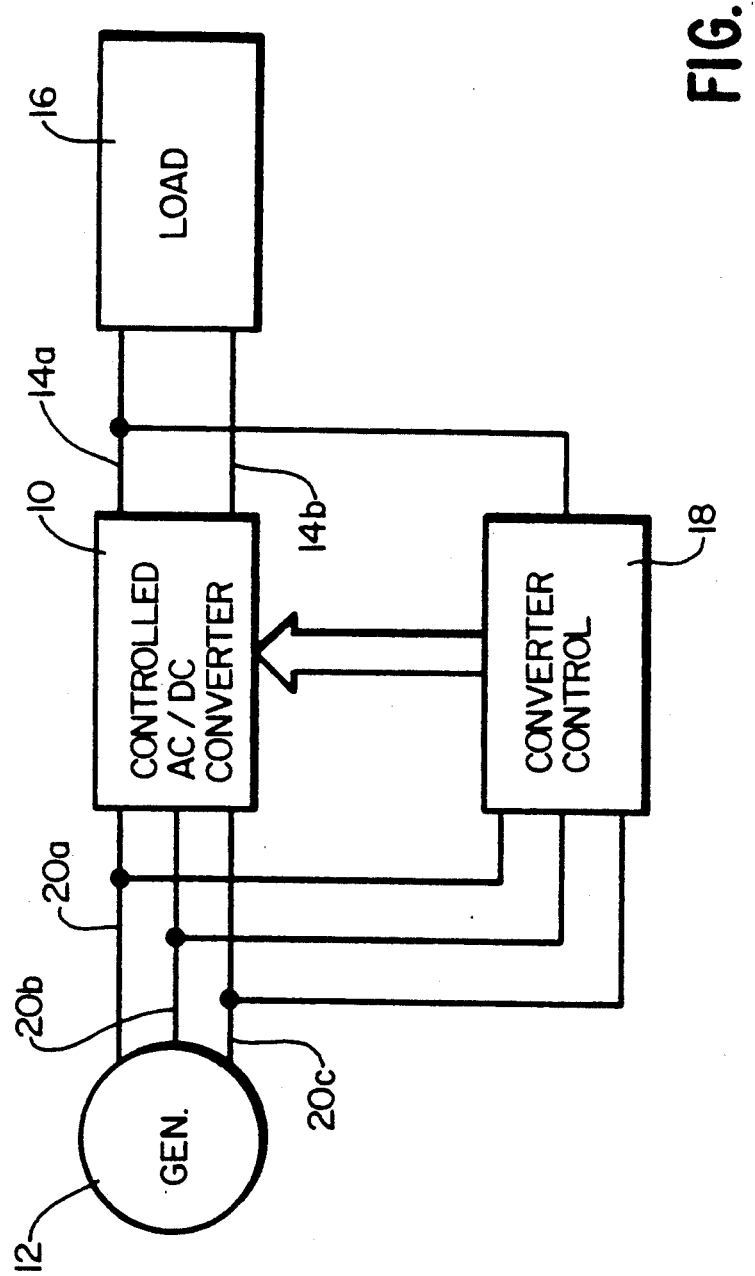
FIG. 1 comprises a block diagram of an AC/DC power conversion system in conjunction with a generator and a load.

Referring now to FIG. 1, a controlled AC/DC converter 10 converts AC power produced by a generator 12 into DC power on first and second DC conductors 14a, 14b. A load 16 is coupled to the conductors 14a and 14b and utilizes the DC power produced thereon.

A converter control 18 is responsive to the voltage produced by the converter 10 across the lines 14a and 14b as well as phase currents flowing through lines 20a, 20b and 20c coupled to the output of the generator 12 and develops control signals for switches in the converter 10.

Figure 2:
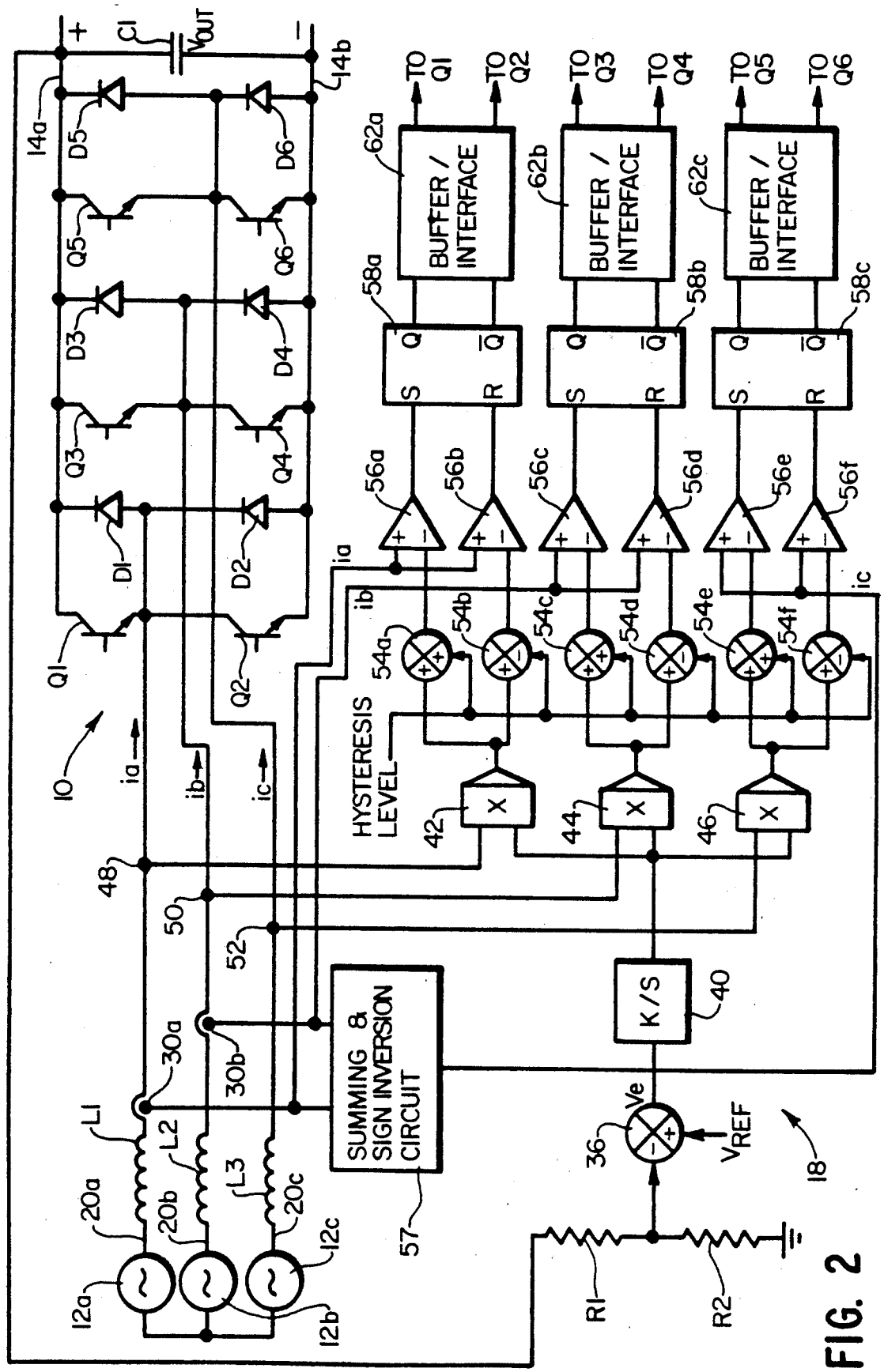
FIG. 2 is a combined simplified schematic and block diagram of the generator and power converter of FIG. 1.

FIG. 2 illustrates the converter 10 in greater detail. For clarity, the generator 12 is illustrated as comprising first, second and third voltage sources which develop three-phase voltages on the lines 20a, 20b and 20c. Connected to the lines 20a-20c are first through third inductors L1-L3, respectively. First and second current sensors 30a and 30b develop current magnitude signals representing the magnitude of phase currents $i_a$ and $i_b$, respectively. The phase currents $i_a$ and $i_b$ as well as a third phase current $i_c$ are provided to the power converter 10. The power converter 10 includes first through sixth power switches in the form of conventional bipolar transistors or insulated gate bipolar transistors Q1-Q6 together with associated flyback diodes D1-D6 connected in anti-parallel relationship therewith. A capacitor C1 is coupled across the DC conductors 14a and 14b.

The converter control 18 includes a summing junction 36 having an inverting input which receives a voltage signal representing the voltage $V_{OUT}$ across the conductors 14a, 14b. The voltage signal is developed by a voltage divider comprising resistors R1 and R2 coupled to the conductor 14a. The summing junction 36 further includes a noninverting input which receives a reference signal $V_{REF}$ representing a desired output voltage level of the converter 10. The summing junction 36 develops an error signal $V_e$ which represents the deviation of the output voltage $V_{OUT}$ of the converter 10 from the desired level and the resulting voltage error signal is amplified by an amplifier 40 of the proportional/integral type and supplied to first inputs of first through third multipliers 42, 44 and 46. Second inputs of the multipliers 42, 44 and 46 receive voltage signals representing the phase voltages produced at points 48, 50 and 52 between the inductors L1-L3 and the power converter 10. Each multiplier 42, 44, 46 produces a sinusoidal current command signal which is provided to noninverting inputs of first through third pairs of summers 54a, 54b or 54c, 54d or 54e, 54f, respectively. Further noninverting inputs of the summers 54a, 54c and 54e and inverting inputs of the summers 54b, 54d and 54f receive a signal representing a hysteresis level. The summers 54a, 54c and 54e produce summed signals representing the sum of the current command signals with the hysteresis level and the summers 54b, 54d and 54f develop difference signals representing the difference between the current command signal and the hysteresis level. Outputs of the summers 54a, 54c and 54d are coupled to inverting inputs of three comparators 56a, 56c and 56e while the outputs of the summers 54b, 54d and 54f are coupled to noninverting inputs of three comparators 56b, 56d and 56f. Noninverting inputs of the comparators 56a, 56c receive the current magnitude signals representing the magnitudes of the currents $i_a$ and $i_b$, respectively, as do inverting inputs of the comparators 56b, 56d. A current magnitude signal representing the magnitude of the phase current $i_c$ as developed by a summing and sign inversion circuit 57 is provided to a noninverting input of the comparator 56e and an inverting input of the comparator 56f. The circuit 57 computes the magnitude of the current $i_c$ using the current magnitude signals developed by the current sensors 30a and 30b according to the following equation:

$$i_c = -(i_a + i_b).$$

The summers 54a-54f cause the comparators 56a-56f to have a hysteresis characteristic. The outputs of the comparators 56a, 56c and 56e are coupled to set inputs of three flip-flops 58a, 58b, 58c while the outputs of the comparators 56b, 56d and 56f are coupled to reset inputs of the flip-flops 58a, 58b, 58c, respectively. The flip flops 58a, 58b, 58c are coupled to buffer and interface circuits 62a, 62b, 62c, respectively, which isolate and amplify the signals produced by the flip flops 58a-58c as needed to provide suitable signals for control of the transistors Q1-Q6. Each buffer and interface circuit 62a-66c controls the switches of one leg of the converter 10. For example, the buffer and interface circuit 62a produces complimentary base drive signals for the switches Q1 and Q2. When the Q output of the flip flop 58a is in a high state, a high state base drive signal is provided to the base of the power switch Q1 and a low state base drive signal is provided to the base of the power switch Q2. When the Q output of the flip flop 58a is in a low state, a low state base drive signal is provided to the base of the power switch Q1 and a high state base drive signal is provided to the base of the power switch Q2. The circuits 62b and 62c operate in identical fashion to control the switches Q3, Q4 and Q5, Q6, respectively.

FIG. 3 illustrates one of the phase voltages $V_a$ produced at the point 48 of FIG. 2 together with the current $i_a$. It should be understood that corresponding voltages and currents $V_b$, $i_b$ and $V_c$, $i_c$ are identical to the waveforms of FIG. 3, except that they are displaced 120° and 240° with respect thereto, as is conventional. The summing junctions 54a, 54b and the comparators 56a, 56b introduce a hysteresis band defined by first and second limits 70, 72 wherein the current $i_a$ rises and falls between the limits 70 and 72. The current thus produced comprises a sawtooth wave superimposed on a sinusoidal waveform. The sinusoidal waveform is in phase with the voltage produced at the point 48, and hence the converter operates substantially at unity power factor.

It can be seen that the converter control of the present invention is simple in design, uses only two current sensors and minimizes the size of the generator 12 for a given power output of the converter 10.

We claim:
1. A control for an AC/DC power converter which converts an AC voltage supplied by an AC source into a DC voltage on DC output conductors, comprising:
   means for developing an error signal representing the deviation of the DC voltage from a desired level;
   means coupled to the developing means and responsive to the AC voltage for deriving a current command signal representing a desired current magnitude from the AC source;
   means coupled to the AC source for generating a current magnitude signal representing the magnitude of the current from the AC source;
   means having a hysteresis characteristic for comparing the current magnitude signal with the current command signal to obtain a comparison signal; and means coupled to the comparing means for operating the AC/DC power converter in accordance with the comparison signal to in turn cause the DC voltage to approach the desired level and to cause the current from the AC power source to have a certain phase relationship with respect to the AC voltage supplied thereby.

2. The control of claim 1, wherein the developing means comprises means for developing a DC voltage signal representing the DC voltage, a summer for summing the DC voltage signal with a reference and an error amplifier coupled to the summer.

3. The control of claim 1, wherein the deriving means comprises a multiplier.

4. The control of claim 3, wherein the comparing means includes summers coupled to the multiplier and comparators coupled to the summers which receive the current magnitude signal.

5. A control circuit for an AC/DC power converter which converts three-phase AC voltages and currents supplied by an AC power source into DC voltage and current on two DC conductors wherein the power converter includes first, second and third pairs of series-connected power switches each coupled across the DC output conductors and wherein a flyback diode is coupled across each switch, comprising:

means for developing an error signal representing the deviation of the DC voltage from a desired level;

first, second and third multipliers coupled to the AC power source and the developing means for multiplying the three-phase AC voltages with the error signal to derive first, second and third current command signals representing desired phase current magnitudes from the AC source;

means coupled to the AC source for generating first, second and third current magnitude signals representing the magnitudes of the phase currents from the AC source;

first, second and third pairs of summers coupled to the first, second and third multipliers, respectively, wherein each pair of summers produces a summed signal and a difference signal representing the sum of one of the current command signals with a hysteresis level and the difference between the current command signal and the hysteresis level, respectively;

first through third pairs of comparators coupled to the first through third pairs of summers, respectively, wherein each pair of comparators compares the summed and difference signals produced by the pair of summers coupled thereto with one of the first, second and third current magnitude signals so that first through sixth comparison signals are developed; and means coupled to the comparators for operating the first, second and third pairs of power switches in accordance with the first through sixth comparison signals to cause the DC voltage to approach the desired level and to cause the converter to operate substantially at unity power factor.

6. The control of claim 5, wherein the developing means comprises means for developing a DC voltage signal representing the DC voltage, a summer for summing the DC voltage signal with a reference and an error amplifier coupled to the summer.

7. The control of claim 5, further including a flip-flop coupled to each pair of comparators.

8. The control of claim 5, wherein the generating means comprises first and second current sensors which develop signals representing the magnitudes of the currents in two phases of the AC source and means coupled to the first and second current sensors for determining from the signals developed thereby the magnitude of the current in the remaining phase of the AC source.

9. The control of claim 8, wherein the determining means comprises a summing circuit which develops one of the current magnitude signals.

* * * * *